United States Patent
Greenberg et al.

[11] Patent Number: 5,878,026
[45] Date of Patent: Mar. 2, 1999

[54] RESOURCE SHARING FOR BOOK-AHEAD AND INSTANTANEOUS-REQUEST CALLS

[75] Inventors: Albert Gordon Greenberg, Millburn, N.J.; Rayadurgam Srikant, Urbana, Ill.; Ward Whitt, Basking Ridge, N.J.

[73] Assignees: AT&T Corp., Middletown, N.J.; Board of Trustees of The University of Illinois, Urbana, Ill.

[21] Appl. No.: 751,806

[22] Filed: Nov. 19, 1996

[51] Int. Cl.$^6$ ........................................ H04J 3/14
[52] U.S. Cl. ............................. 370/230; 370/252
[58] Field of Search ................... 370/229, 230, 370/231, 232, 235, 236, 252, 253, 412, 415, 416, 428, 429

[56] References Cited

U.S. PATENT DOCUMENTS

| | | | |
|---|---|---|---|
| 4,984,264 | 1/1991 | Katsube | 370/230 |
| 5,274,644 | 12/1993 | Berger et al. | 370/230 |
| 5,311,513 | 5/1994 | Ahmadi et al. | 370/230 |
| 5,335,222 | 8/1994 | Kamoi et al. | 370/230 |
| 5,581,544 | 12/1996 | Hamada et al. | 370/253 |

OTHER PUBLICATIONS

Stephen G. Eick, et al., The Physics of the $M_t/G/\infty$ Queue, *Operations Research*, vol. 41, No. 4, Jul.–Aug. 1993, pp. 731–742.

*Primary Examiner*—Alpus H. Hsu

[57] ABSTRACT

Because it is difficult to provide adequate quality of service to large-bandwidth calls in integrated-services networks, service providers may allow some customers to book ahead their calls. The present invention provides a scheme resource sharing among book-ahead calls (that announce their call initiation and holding times upon arrival) and non-book-ahead calls (that do not announce their holding times and enter service immediately, if admitted). The basis for this sharing is an admission control algorithm in which admission is allowed if an approximate interrupt probability (computed in real time) is below a threshold. Simulation experiments show that the proposed admission control methodology is superior to alternative schemes that do not allow interruption, such as a strict partitioning of resources.

8 Claims, 6 Drawing Sheets

*FIG. 1*

PROFILE OF BA CALLS

RESOURCE SHARING FOR BOOK-AHEAD AND INSTANTANEOUS-REQUEST CALLS

FIELD OF THE INVENTION

The present invention relates generally to communication networks, and more specifically to the allocation of resources between book-ahead and instantaneous-request calls in an integrated-services network.

BACKGROUND INFORMATION

In integrated-services networks, it is difficult to provide adequate quality of service to large bandwidth calls, such as video conference calls, without adversely affecting the network utilization. One way to alleviate this problem is to allow customers of the network to book their calls ahead of the actual call initiation time, much like calling ahead to make a reservation at a restaurant.

It would be possible to allow for both book-ahead calls (which announce their expected holding times) and instantaneous-request calls (which do not) by partitioning the network resources into two disjoint subsets dedicated to each class. Alternatively, the network resources could be shared without strict partitioning by, e.g., having a moving boundary between the classes, thereby allowing resource sharing without allowing any calls in progress to be interrupted.

There is a drawback, however, to using strict resource partitioning schemes which do not allow call interruption. Such resource sharing schemes often lead to under-utilization of network resources. It may be desirable, therefore, to implement resource sharing in a manner that allows some calls in progress to be interrupted, but increases network resource utilization and the revenue derived therefrom.

SUMMARY OF THE INVENTION

The present invention provides a scheme for the sharing of resources in an environment in which resources can be both reserved in advance, or "booked ahead," and used on a non-book ahead, or "instantaneous-request," basis, and in which interruption of resource use is allowed in order that overall resource utilization is greater than if no such interruptions were allowed. In one embodiment, the present invention provides a scheme for communication network resource sharing among "book-ahead" calls (that announce their intended call initiation and call holding times) and non-book-ahead (or "instantaneous-request") calls (that do not announce their expected call holding times) in an integrated-services network. The basis for network resource sharing according to this embodiment of the present invention is an admission control algorithm in which admission of an instantaneous-request call is allowed if an approximate interrupt probability (computed in real time) is below a certain threshold. Simulation experiments show that the admission control algorithm according to the present invention provides superior resource utilization and revenue generation as compared to alternative schemes, such as strict partitioning of resources, that do not allow call interruption.

The network resource sharing scheme of the present invention, unlike strict partitioning schemes, allows for the possibility of call interruption. Thus, the present scheme is similar in this respect to the statistical multiplexing of cell streams in asynchronous transfer mode (ATM) networks in which, instead of reserving resources to accommodate traffic at its peak rate, small cell loss probabilities are allowed in order to increase the number of streams admitted. Another communications traffic handling system which has some similarities to the present resource sharing scheme is a wireless network, in which small handoff dropping rates are allowed to increase the overall network utilization.

DETAILED DESCRIPTION

The present invention relates to a resource sharing scheme which can be employed in a number of contexts. While the discussion that follows refers specifically to resource sharing in a communication network, application of the present invention is not limited to the communication network context.

In the following description of one embodiment of the present invention, resource sharing is discussed in the context of a communication network. Reference to "calls" in the following discussion refers to any communication sessions wherein communication network resources are utilized and includes, for example, voice calls, data communications, etc. The term "book-ahead calls" herein refers to calls which announce a proposed call initiation (i.e., book-ahead) time and a proposed call holding time. "Instantaneous-request calls" herein refers to calls which do not book ahead, but instead enter service immediately upon arrival (if they are admitted into the network), without announcing their expected call holding times.

If a book-ahead call is admitted, then it enters service at the original arrival time plus the book-ahead time, it spends the call holding time in service, and then it departs. If t1, t2 and t3 are the arrival time, book-ahead time and holding time, respectively, for a book-ahead call, then the book ahead call would be in service in the interval (t1+t2) through (t1+t2+t3), if it is admitted.

For purposes of the present invention, the announced expected holding time for a book-ahead call may be an estimate or a safe upper bound. The network capacity used by a book-ahead call will be made available for other callers when the book-ahead customer departs or the holding time expires, whichever happens first.

In one embodiment of the present invention, a book-ahead call is allowed to extend its holding time. This is accomplished by, e.g., treating a request for an extended holding time as a new book-ahead call. For this new request, the book-ahead time is the interval between the request epoch and the epoch the book-ahead call was previously scheduled to depart. The holding time of the new request would be the incremental holding time. Thus, if the book-ahead call made a request at time t4 to depart at time t1+t2+t3+t5, where t1<t4<(t1+t2+t3), then the new request would have book-ahead time t1+t2+t3−t4, and holding time t5.

Resource sharing according to the present invention is based on an admission control policy which, in turn, is based on an interrupt probability computation for each arriving call. The present admission control policy lets an instantaneous-request call be admitted if a computed interrupt probability is less than a certain threshold; otherwise the call is blocked. A book-ahead call is admitted (i.e., scheduled for a future call initiation time) if: (1) there is room for the call, considering only previously booked book-ahead calls; and (2) the interrupt probability will not exceed a second interrupt probability threshold (which can be, but is not necessarily, the same as the threshold applied to instantaneous-request calls) after the present call is admitted.

In accordance with the present invention, there are a number of ways in which the determination can be made as to which call is to be interrupted, if need be. Because call interruption is likely to be a rare event, the specific choice of which call to interrupt should not effect the performance of the present admission control policy much. In general, the call which is considered the least valuable should be the one interrupted. If, e.g., the value of a completed call is deemed to increase with the duration of the call, then it may be better to interrupt a call that arrived more recently, as opposed to a call that arrived earlier.

Accordingly, a number of exemplary call interruption policies can be used in accordance with the present invention. One such policy is the interruption of the call that arrived most recently, whatever its type. (For book-ahead calls, the arrival time is deemed to be the time the request was made, not the time the call starts service.)

Another interruption policy that can be employed is interruption of the instantaneous-request call that arrived most recently. Pursuant to this interruption policy, book-ahead calls would be never interrupted. This policy would be preferred if book-ahead calls are considered more valuable. Yet another example of an interruption policy which can be employed in accordance with the present invention is interruption of the call that arrived most recently, with the exception that book-ahead calls which booked far in advance are given priority over instantaneous-request calls and book-ahead calls which did not book much in advance of the call initiation time.

The present invention can be used in conjunction with these and other call interruption policies. If book-ahead calls usually book far in advance, as compared with the holding times of instantaneous-request calls (which is likely to be the case), then there is little effective difference between the above-listed interruption policies. For example, in a standard telecommunications network, ordinary instantaneous-request voice calls have a mean holding time of about five minutes, while teleconference calls may be booked days in advance. The simulation results depicted in FIGS. 2 through 8 and discussed below are for the case in which book-ahead calls book far ahead.

It is important in the implementation of an admission control policy that the interrupt probability computation be made quickly, so that the admission control decision can be made in real time. Since the exact computation of the interrupt probability can be computationally prohibitive, the present invention includes several approximation schemes for the interrupt probability computation. These approximation schemes are described below. In addition, simulation results for various of the schemes are depicted in FIGS. 2 through 8 and discussed below. These simulation results show that the interrupt probability approximation schemes according to the present invention are very effective from the perspective of both real-time computation and expected revenue. In particular, the simulation results show that the admission control policy according to the present invention can yield higher resource utilization and greater revenue from network resources than do alternative schemes which do not allow call interruption.

If book-ahead calls book relatively far ahead, the book-ahead feature gives book-ahead calls priority over instantaneous-request calls. Thus, it may be desirable to provide some service guarantees to instantaneous-request calls. Accordingly, in one embodiment of the present invention, an upper limit on the network capacity allowed for use by book-ahead calls is included. In this embodiment, then, a book-ahead call will not be admitted if it causes the number of book-ahead calls in the system to exceed the specified threshold at any time.

Since some instantaneous-request customers may object strongly to interruptions, it may be desirable to have multiple classes of instantaneous-request calls, only some of which can experience interruptions. With multiple classes, an interruption scheme in which, e.g. the most recent arrival from the lowest ranked class present is interrupted could be employed. Alternatively, for example, a more complicated interruption scheme could be employed in which both class type and call arrival time are taken into consideration in determining which call to interrupt. Although the following discussion of the present invention makes reference to a single instantaneous-request customer class, the present invention can readily incorporate multiple instantaneous-request call classes without additional complexity if all classes have the same holding-time distribution.

In the simulations discussed below, it was assumed that arriving book-ahead calls whose initial requests could not be met were blocked and lost. In reality, however, book-ahead calls could modify their requests, i.e., accept an alternative available time slot. It is significant that the admission control policy of the present invention for instantaneous-request calls applies equally well with such modifications.

In the simulations, it was also assumed that, upon the arrival of each call, the service provider knows the number of instantaneous-request calls in progress and the number of previously admitted book-ahead calls (in progress or scheduled for a future time) that will be present at all times in the future. The data regarding the in-progress and scheduled book-ahead calls is referred to herein as the book-ahead call profile. What is computed (approximately) is the probability of an interruption at any time in the future, given the calls in service, the previously scheduled book-ahead calls and the new arrival, but ignoring all future arrivals.

Figure 9:
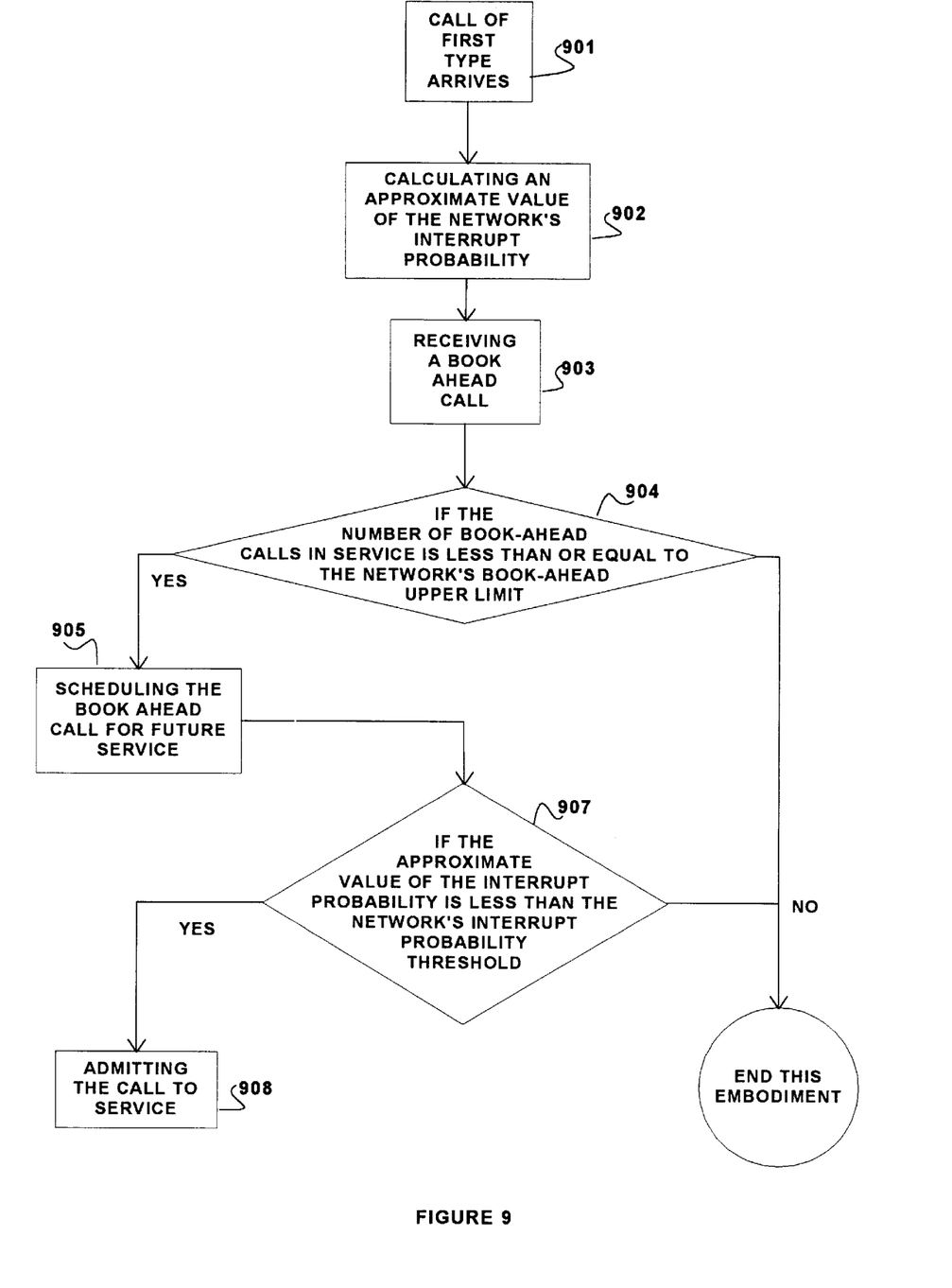
FIG. 9 is a flow chart illustrating an embodiment of a method according to the present invention.

It is important to note that an admitted call's probability of eventually being interrupted can be altered by events after its arrival if book-ahead calls do not book far ahead. For example, if only instantaneous-request calls are interrupted, then future book-ahead arrivals can increase the probability that an instantaneous-request call will eventually be interrupted. This means that the call's chance of being interrupted can actually exceed the threshold, even though the computed interrupt probability upon arrival is less than the threshold. This impact should not be too great, however, because if there is serious congestion, the new book-ahead calls that would cause this problem should themselves be unlikely to be admitted. This complication does not arise in the cases in which the book-ahead times are generally substantially greater than the instantaneous-request holding times. If necessary, this can be enforced by having a minimum book-ahead time. FIG. 9 is a flow chart illustrating an embodiment of the present invention. When a call of the first type arrives at step 901, an approximate value of the network's interrupt probability is calculated at step 902. In one embodiment of the present invention, if at step 907 the approximate value of the interrupt probability is less than the network's interrupt probability threshold, then at step 908 call is admitted to service.

In one embodiment of the present invention, the network is capable of receiving calls of at least a first type and a second type. The calls of the first type that arrive at step 901 can be instantaneous-request calls, and calls of the second type can be book-ahead calls.

In one embodiment of the present invention, the network can have an associated book-ahead call profile, and the interrupt probability can be a function of both the number of instantaneous-request and book-ahead calls in service at the time the call arrives and of the book-ahead call profile. For example, but not the only example, the approximate value of the interrupt probability can be calculated using an independent peaks approximation scheme; the approximate value of the interrupt probability can be calculated using a fixed time approximation scheme; the approximate value of the interrupt probability can be calculated using a one peak approximation scheme.

In one embodiment of the present invention, in addition to the steps discussed above, at step 903, a book-ahead call is received. If at step 904 the number of book-ahead calls in service is determined to be less than or equal to the network's book-ahead upper limit, then the book-ahead call is scheduled for future service at step 905.

Figure 10:
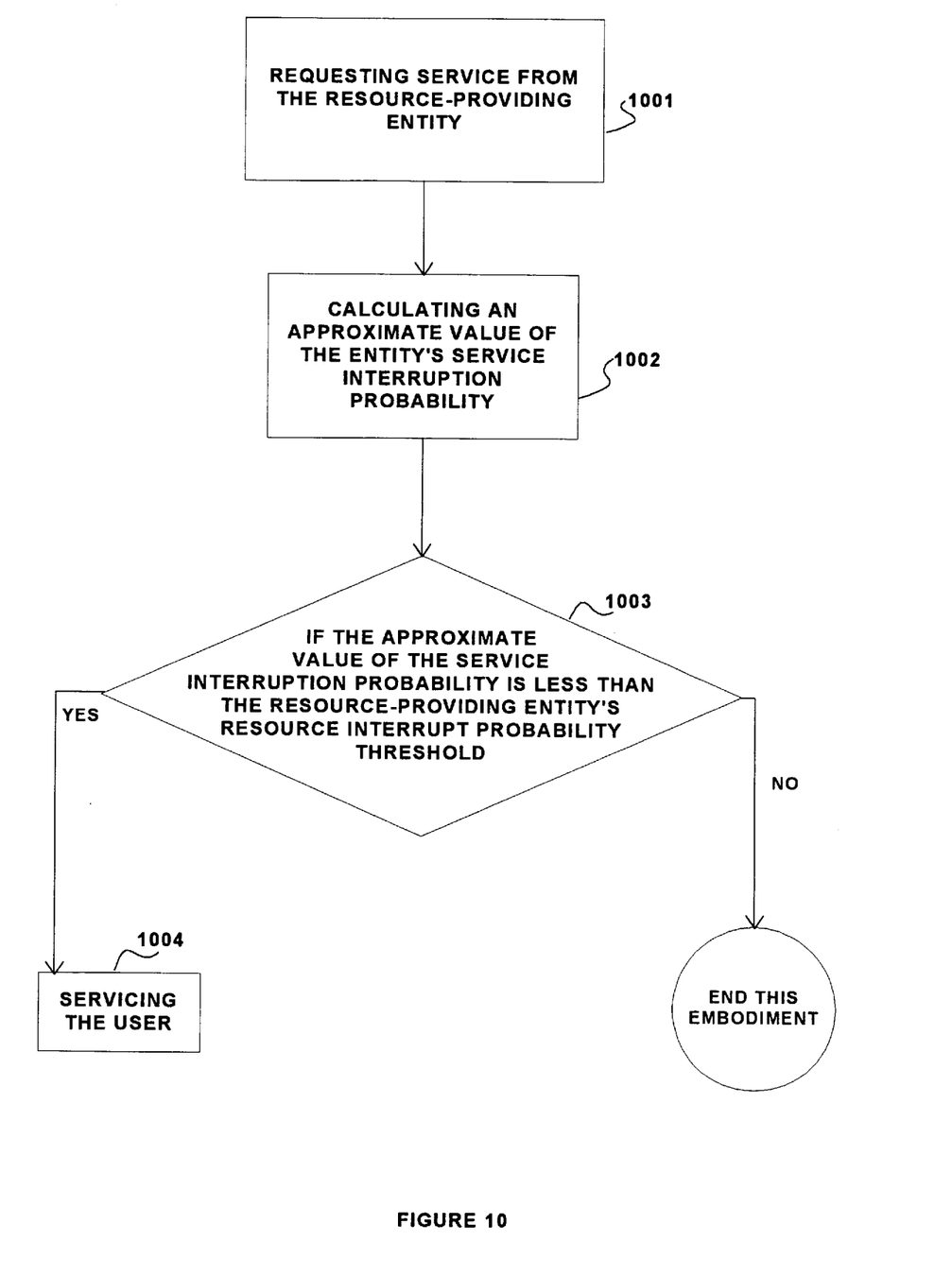
FIG. 10 is a flow chart illustrating another embodiment of a method according to the present invention.

FIG. 10 is a flow chart illustrating another embodiment of the present invention. A service from a resource-providing entity is requested at step 1001. At step 1002, an approximate value of the entity's service interruption probability is calculated. If the approximate value of the service interruption probability is less than the resource-providing entity's resource interrupt probability threshold at step 1003, then the user is serviced at step 1004.

1. Admission Control Schemes For Instantaneous-Request Calls

The admission control schemes for instantaneous-request calls according to the present invention are based on calculating an approximate probability that the call under consideration will be interrupted if it is admitted to service. This interrupt probability calculation is based, in turn, on the probability distribution of the holding time of this new call and information about the other calls in the system at this arrival epoch. Thus, it is necessary to know the call holding time distribution for the instantaneous-request calls. The distribution may be estimated from historical data by standard methods. One possibility is to use an exponential distribution characterized by its mean, where the mean is estimated by a sample average.

The present admission control algorithm also performs reasonably well if the actual distribution is not exponential, but performance can be improved by taking into account the true distribution. For this purpose, an algorithm for computing interrupt probabilities with a general instantaneous-request holding-time distribution is discussed in section 3 below. In that case, a further assumption is made that the instantaneous-request calls arrive according to a Poisson process. This assumption leads to an algorithm that has the same computational complexity as in the exponential case. It would be natural to also use this algorithm as an approximation for other arrival processes. With or without a Poisson arrival process, the elapsed holding times (ages) of the instantaneous-request calls in progress have an impact on the residual holding-time distribution when the underlying holding-time distribution is not exponential, but the algorithm discussed in section 3 does not use the ages.

For the interrupt probability calculation, it is initially assumed that the instantaneous-request calls in service have independent holding times, each with an exponential distribution. It is also assumed that the initiation and termination times for all future book-ahead calls are known.

In addition, it is assumed that instantaneous-request calls request 1 unit of bandwidth, book-ahead calls request b units of bandwidth and the total available bandwidth on the link is s. (The network resource-sharing approach of the present invention extends to heterogeneous book-ahead calls with different bandwidth requirements, but it exploits the common bandwidth requirement for instantaneous-request calls, which need not be 1 unit.) As discussed above, there are several possible interruption policies, but to be definite it is assumed in the following discussion that the most recent instantaneous-request arrival is interrupted when an interruption is necessary.

As shown below, it is possible to state a precise expression for the interrupt probability (considering only previously accepted book-ahead calls), under the assumptions discussed above. However, actually performing the calculation can be difficult. Thus, the present invention implements an admission control strategy by calculating an approximation for the interrupt probability. Several candidate approximation schemes are presented below. The most promising one seems to be the independent peaks approximation (IPA), developed in Section 1.2 below, which provides high performance at manageably low computational overhead. In this section it is assumed that the instantaneous-request holding-time distribution is exponential; in section 3 the case of a general instantaneous-request holding-time distribution is discussed.

1.1. Computing The Exact Interrupt Probability

This section describes how to compute the interrupt probability for each arriving call using the number of instantaneous-request calls present at the arrival instant and the future profile of book-ahead calls. The decision depends on whether the interrupt probability is greater than or less than a certain threshold. It will be apparent from the expression, below, for the exact interrupt probability computation that it is difficult to implement. This difficulty is avoided through the use of interrupt probability approximations, as discussed in section 1.2 below.

Figure 1:
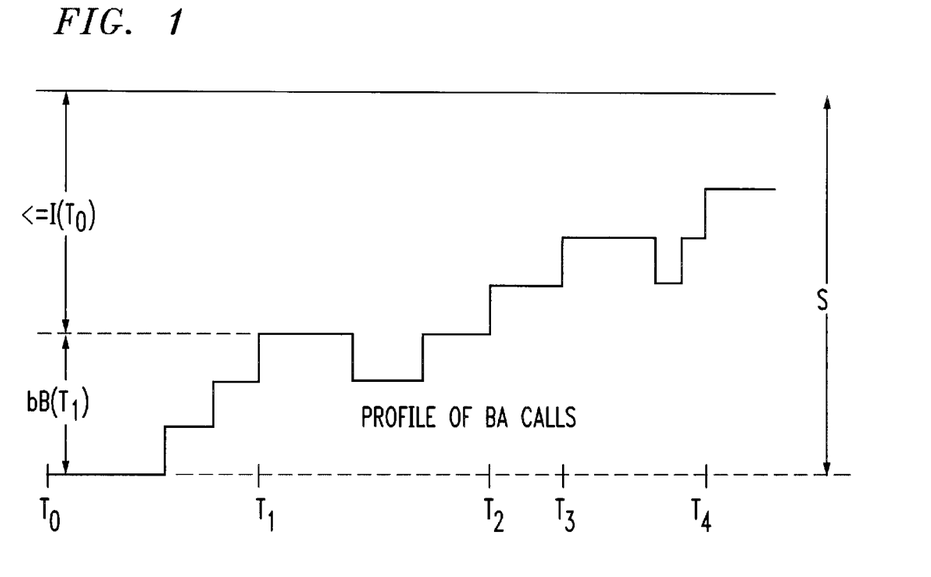
FIG. 1 depicts the possible interrupt times for an instantaneous-request call given a book-ahead call profile according to the present invention.

Let I(t) denote the number of instantaneous-request calls and B(t) the number of book-ahead calls in progress at time t, respectively. Suppose that a new instantaneous-request call arrives at time $T_0$ and a decision has to be made whether or not to admit this call. Then the first potential interruption time for this instantaneous-request arrival at time $T_0$ is $$T_1 = \min\{t \geq T_o | I(T_o) + bB(t) \geq s\}, \quad (1.1)$$

where s is the total bandwidth (capacity). Then subsequent potential interruption times for the instantaneous-request arrival at time $T_0$ are the times $T_i$, i=2, 3 . . . , such that $T_1 < T_2 < \ldots$ , and $B(T_i) = B(T_{i-1}) + 1$. An example of a book-ahead call profile and the potential interruption times $\{T_0, T_1, \ldots\}$ are shown in FIG. 1.

Let $n(T_0)$ denote the number of instantaneous-request calls that have to clear down (complete their service) by $T_1$ so that the new call that arrived at $T_0$ is not interrupted. Clearly, $n(T_0) = I(T_0) - s + bB(T_1) + 1$. The number of potential interrupt times $T_i$ is less than or equal to s/b. In practice, attention can be restricted to only those interrupt times that lie within a certain interval. Suppose the first 1 possible interrupt times are considered, i.e., $\{T_1, T_2, \ldots, T_l\}$. Let N(t) denote the number of instantaneous-request calls (not including the new arrival at $T_0$) that are in the system at time $T_0$ and complete their service by time t for $t > T_0$. Let X denote the holding time of the new instantaneous-request arrival at time $T_0$. Then the probability that the arriving instantaneous-request call at $T_0$ will be interrupted at a later time is $$P(T_o) = P(N(T_1) < n(T_o)) \cdot P(X > T_1 - T_o) + \quad (1.2)$$
$$P(N(T_1) \geq n(T_o) \cdot N(T_2) < n(T_o) + b)P(X > T_2 - T_o) + \ldots +$$
$$P(N(T_1) > n(T_o), \ldots, N(T_l) > n(T_o) + (l-1)b)P(X > T_l - T_o).$$

Assuming that instantaneous-request holding times are exponentially distributed, it is possible to compute (1.2); e.g., then $$P(X > t) = e^{-\mu t}$$

and N(t) has a binomial distribution with parameters $I(T_0)$ and $$1 - e^{-\mu(t-T_o)}.$$

Even though an explicit expression for (1.2) can be given, the computation is challenging.

1.2 Approximate Computations of the Interrupt Probability

In this section, three, successively more complex, approximations for the interrupt probability in (1.2) are discussed.

1. Fixed Time Approximation (FTA)

In FTA, the interrupt probability is approximated by:

$$p(T_o) \approx e^{-\mu(T_1 - T_o)};$$

i.e., FTA ignores all interrupt times other than $T_1$ and does not use the information about the number of existing instantaneous-request calls at time $T_0$.

2. One Peak Approximation (OPA)

The OPA uses a lower bound for $p(T_0)$ by using only the first term on the right hand side of (1.2). In other words, the calculation is made using only one interrupt time $T_1$. Thus, the interrupt probability $p(T_0)$ is approximated by $$p(T_o) \approx \sum_{k=0}^{n(T_o)-1} \binom{I(T_o)}{k} (1 - e^{-\mu(T_1 - T_o)})^k e^{-\mu(T_1 - T_o)(I(T_o) - k + 1)} \quad (1.3)$$

3. Independent Peaks Approximation (IPA)

The IPA assumes that the probability of the arriving call at $T_0$ being interrupted at each of the possible interrupt times $\{T_1, T_2, \ldots, T_l\}$ are independent of each other. Thus, the interrupt probability $p(T_0)$ is upper bounded by $$p(T_o) \approx \sum_{i=1}^{l} P(N(T_1) < n(T_o) + (i-1)b)P(X > T_i - T_o) \quad (1.4)$$
$$= \sum_{i=1}^{l} \sum_{k=0}^{n(T_o)+(i-1)b-1} \binom{I(T_o)}{k} (1 - e^{-\mu(T_i - T_o)})^k e^{-\mu(T_i - T_o)(I(T_o) - k + 1)}$$

IPA is used to approximate the interrupt probability in a preferred embodiment of the present invention, because it was found to be very accurate while remaining a very manageable computation. If call interruptions are a concern, then IPA is conservative, because it is an upper bound. Since OPA is a lower bound, both OPA and IPA are accurate if they are close together.

1.3 Constant Holding Time Approximation (CHTA)

This section introduces an admission control scheme that need not be regarded as an interrupt probability calculation. The CHTA admission control scheme for instantaneous-request calls acts as if each new instantaneous-request call has constant holding time H. The call is admitted if there is sufficient spare capacity in the link for H time units. Otherwise, the call is rejected. Scheduled completion times are monitored. If the call departs before H units of time, then this space is made available to any other call that requests it. Otherwise, whenever a new call arrives, all existing instantaneous-request calls that have lasted for more than H time units are counted as being there at this instant, but leaving a short (infinitesimal) interval later.

If we make H very large, e.g., H=∞, then call interruptions are essentially ruled out. Instantaneous-request arrivals will not be admitted if any contention is possible in the future. Similarly, new book-ahead requests will not be admitted if instantaneous-request calls in progress could then be interrupted. Note that FTA is not the same as CHTA with H=K, because CHTA has scheduled completion times for calls in progress.

The simulation examples discussed below show that CHTA performs poorly compared to the schemes that are based on an interrupt probability computation when the instantaneous-request holding times are not in fact constant. Moreover, for finite values of H, there is "book-keeping" involved in updating the free capacity in the system.

2. Simulation Results

In this section the traffic model and service objectives according to the present invention are discussed. The traffic model discussed here was used in the simulations, discussed below, of the present admission control scheme, but the admission control scheme does not require use of this model. Here it is assumed that book-ahead and instantaneous-request calls (service requests) arrive according to independent stationary stochastic point processes with rates $\lambda_B$ and $\lambda_I$. It is further assumed that the book-ahead (instantaneous-request) call holding times have a common distribution with mean $\mu_B^{-1}$ ($\mu_I^{-1}$). It is also assumed that the successive book-ahead times are independent, identically distributed random variables with mean $t_b$. It is assumed that the arrival processes, holding times and book-ahead times are all mutually independent.

To characterize the performance of the admission control, the following are focused upon:

$P_I$: Blocking probability for instantaneous-request calls, i.e., the long-run fraction of instantaneous-request calls that are rejected either by the admission control algorithm or due to the link being full.

$P_B$: Blocking probability of book-ahead calls, i.e., the long-run fraction of book-ahead calls that are rejected, either due to insufficient capacity for the entire duration of the pre-announced holding time or due to some admission control such as an upper limit.

p: the interrupt probability for instantaneous-request calls, i.e., the long-run fraction of admitted instantaneous-request calls that are interrupted while they are in progress due to the link being full.

As indicated above, it is assumed here that book-ahead calls are not interrupted. When there is contention for resources among admitted calls, it is assumed that instantaneous-request calls are interrupted, with the most recent instantaneous-request arrival being interrupted first.

Suppose that there are per-call revenues of $R_I$ and $R_B$ for instantaneous-request and book-ahead calls that complete service, and a per-call cost of $C_I$ for interrupting an instantaneous-request call. Suppose that there are also per-time revenue rates $r_I$ and $r_B$ for instantaneous-request and book-ahead calls that complete service. Then the admission control scheme for admitting instantaneous-request and book-ahead calls could be chosen to maximum the rate of revenue:

$$R \equiv (1 - P_I)(1-b)\left(R_I + \frac{r_I}{\mu'_I}\right)\lambda_I + (1 - P_B)\left(R_B + \frac{r_B}{\mu_B}\right)\lambda_B, \quad (2.1)$$

subject to the constraint $p \leq P$, where P is an upper bound on the interrupt probability of instantaneous-request calls and $1/\mu'_I$ is the average holding time for instantaneous-request calls that are not interrupted. Note that $\mu'_I$ is not $\mu_I$; conditioning on interruption affects the holding-time distribution. The average completed portion of interrupted calls tends to be greater than $1/\mu_I$, whereas the average length of uninterrupted calls tends to be less than $1/\mu_I$. However, when the interrupt probability is very small, as is usually desired, then $\mu'_I$ tends to be nearly the same as $\lambda_I$. Hence, one might substitute $\mu_I$ for $\mu'_I$ in (2.1).

This section discusses simulation results illustrating how the instantaneous-request interrupt probability approximations perform. The simulations were conducted in the framework of the traffic model discussed above. Here it is assumed that instantaneous-request and book-ahead calls arrive according to independent Poisson processes and that all holding times are exponentially distributed. As indicated earlier, it is assumed also that all book-ahead calls book far ahead compared to instantaneous-request holding times.

For simplicity, it is assumed that all book-ahead calls book ahead by a constant amount $t_b$ with $t_b >> 1/\mu_I$. Given that $t_b >> 1/\mu_I$, booking ahead by a constant amount is without much loss of generality, because the book-ahead service initiation times form a Poisson process even with random book-ahead times. This property is equivalent to the departure process in an $M/GI/\infty$ queueing model being a Poisson process. An $M/GI/\infty$ queue has a Poisson arrival process, independent and identically distributed service times and infinitely many servers. (See, for example, S. G. Eick, W. A. Massey and W. Whitt, "The Physics of the $M_t/G/\infty$ Queue," Operations Research, 41:731–742, 1993.) The constant book-ahead times ensure that the book-ahead calls all book far ahead. This could also be achieved with a random book-ahead time that is required to exceed some minimal value.

EXAMPLE 1

Let the available capacity (number of servers) be s=100, the bandwidth (the number of servers) requested by each large bandwidth call be b=10, the arrival rate of the small bandwidth call class $\lambda_I$=60, and the arrival rate of the large bandwidth call class be $\lambda_B$=2. Let the average holding times for both call classes be 1. Recall that the bandwidth of the small bandwidth call class is assumed to be 1. Simulations were conducted to estimate the blocking probabilities as a function of the instantaneous-request interrupt probability threshold $P_T$ and the upper limit s–r on book-ahead calls. For this first example, no upper limit was imposed on book-ahead calls, so that r=0.

Figure 2:
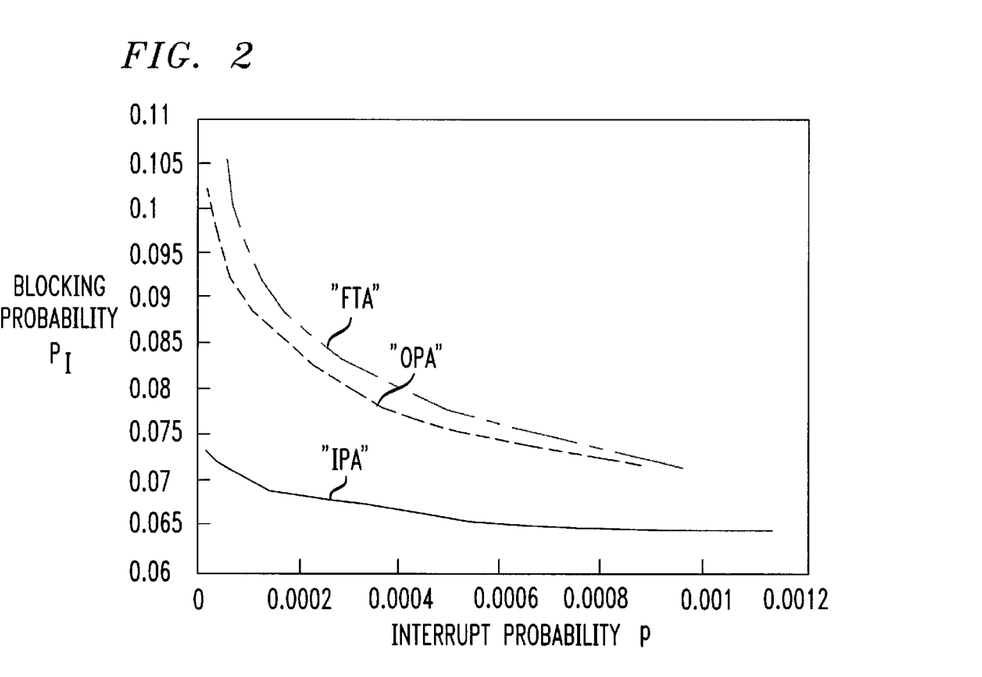
FIG. 2 depicts plots of the interrupt probability versus the blocking probability for a first simulation example using various interrupt probability approximation schemes according to the present invention.

Given the input control $P_T$, estimates of $P_B$, $P_I$ and p were obtained from each simulation run. Each curve is based on 10 different values for $P_T$. For each value of $P_T$, the simulation run length was 100,000 time units, after deleting 25 time units to get rid of transients. Thus, roughly 6 million instantaneous-request arrivals and 2 million book-ahead arrivals were simulated for each point in the curve. Plots of p versus $P_I$ for the three approximation procedures in section 1.3 are shown in FIG. 2. The steady-state simulation run length of 100,000 was divided into 20 batches to compute confidence intervals which are not shown here. However, the fact that the unsmoothed plot looks fairly smooth indicates that the accuracy of the data points is good.

The book-ahead blocking probability $P_B$ is independent of $P_T$ and was 0.000038 in this case. The interesting tradeoff is between $P_I$ and p. As $P_T$ increases, p increases, but $P_I$ decreases. From FIG. 2, it is clear that for each fixed p, IPA has significantly smaller $P_I$ than FTA or OPA. Note that this automatically implies that IPA gives higher rate of revenue under criterion (2.1). The algorithm CHTA in Section 1.3 performs significantly worse than the other three algorithms. Its performance is so much inferior that it is difficult to show it on the same graph with the other three algorithm without obscuring relevant details. Therefore, its performance data is given in Table 1.

TABLE 1

Performance of CHTA for s = 100, b = 10, $\lambda_I$ = 60, $\lambda_B$ = 2, $\mu_I$ = $\mu_B$ = 1.

| H | $P_I$ | p |
|---|---|---|
| 0.1 | 0.0194 | 0.03641 |
| 1.0 | 0.0197 | 0.03618 |
| 4.0 | 0.1135 | 0.00252 |
| 5.0 | 0.1412 | 0.00082 |
| 10.0 | 0.24 | 0.00005 |
| — | 0.26 | 0 |

The last three lines of Table 1 dramatically illustrate a key point: allowing small interrupt probabilities can lower blocking probabilities significantly. One could also observe this effect under the IPA scheme by setting $P_T=0$ (which leads to p=0.) When $P_T=0$, the instantaneous-request blocking probability $P_I$ was found to be 0.264, which is much larger than the largest value observed for the IPA curve in FIG. 2.

EXAMPLE 2

Figure 3:
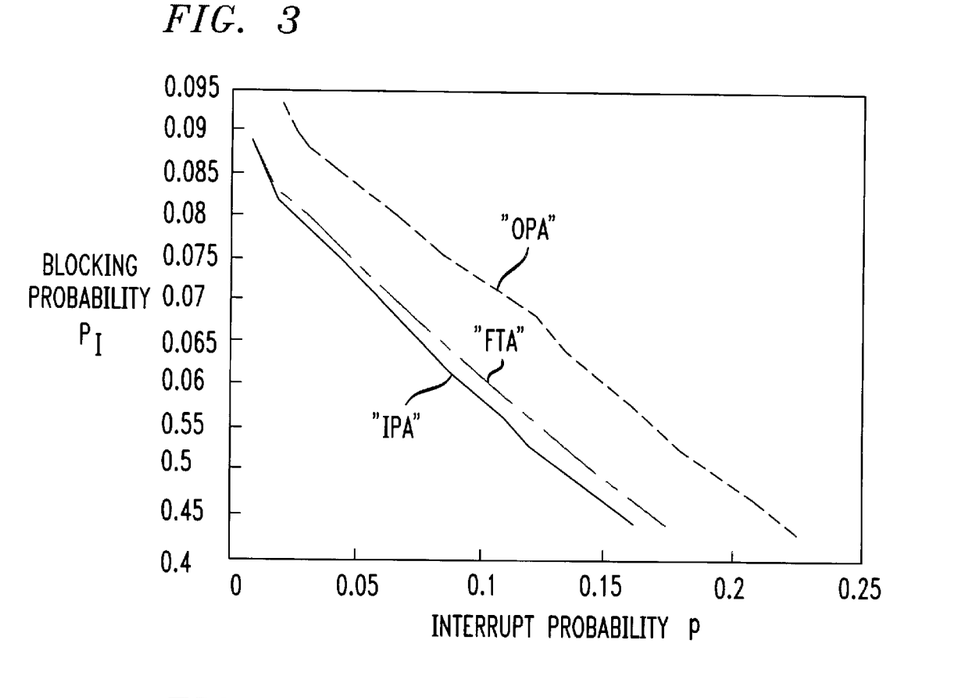
FIG. 3 depicts plots of the interrupt probability versus the blocking probability for a second simulation example using various interrupt probability approximation schemes according to the present invention.

In contrast to Example 1, here a scenario was considered where the blocking probability for instantaneous-request calls is high. The arrival rate of the book-ahead calls was also made high, so that the number of "peaks" (interrupt times) in the profile is large when viewed by an arriving instantaneous-request call. In particular, the parameters are s=40, $\lambda_I$=24, $\mu_I$=1, $\lambda_5$=16, $\mu_B$=4 and b=5. Plots of p versus $P_I$ are shown in FIG. 3.

Each curve is based on 10 different values of $P_T$. For each value of $P_T$, the simulation run length was 10,000 time units, after deleting 25 time unit s to get rid of transients. Thus, in this case, roughly 240,000 instantaneous-request calls and 160,000 book-ahead calls were simulated for each point on the curve. Again, IPA has the best performance, but in this case the FTA curve is quite close to the IPA curve.

EXAMPLE 3

Figure 4:
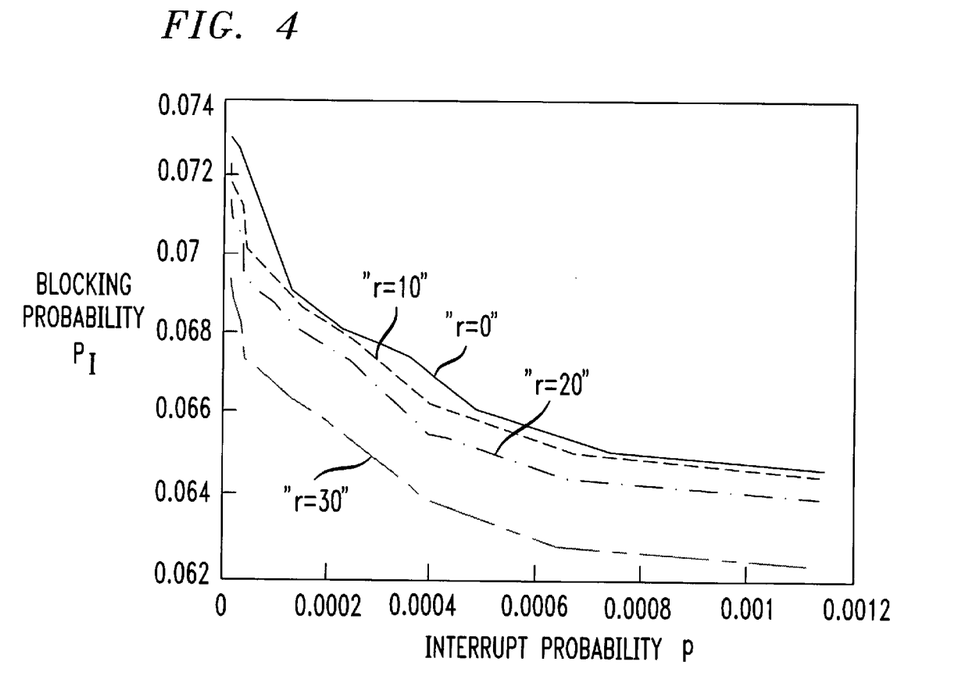
FIG. 4 depicts plots of the interrupt probability versus the blocking probability for a third simulation example using various values of a reservation parameter according to the present invention.

This example demonstrates how the upper limit s–r can be effectively used to improve the rate of revenue. Consider the same set of system parameters as in Example 1, except for a new control variable r. Plots of p versus $P_I$ for various values of r using the IPA policy are shown in FIG. 4. The corresponding values $P_B$ are shown in Table 2. As in Example 1, the curve is based on ten different values for $P_T$, and for each value of $P_T$, the simulation run length was 100,000 after deleting 25 time units to get rid of transients.

TABLE 2

$P_B$ as a function of r with s = 100, b = 10, $\lambda_I$ = 60, $\lambda_B$ = 2, $\mu_I$ = $\mu_B$ = 1.

| r | $P_B$ |
|---|---|
| 10 | 0.000038 |
| 20 | 0.000191 |
| 30 | 0.000859 |
| 40 | 0.003441 |
| 50 | 0.012085 |
| 60 | 0.036697 |
| 70 | 0.095238 |
|    | 0.210526 |

Figure 5:
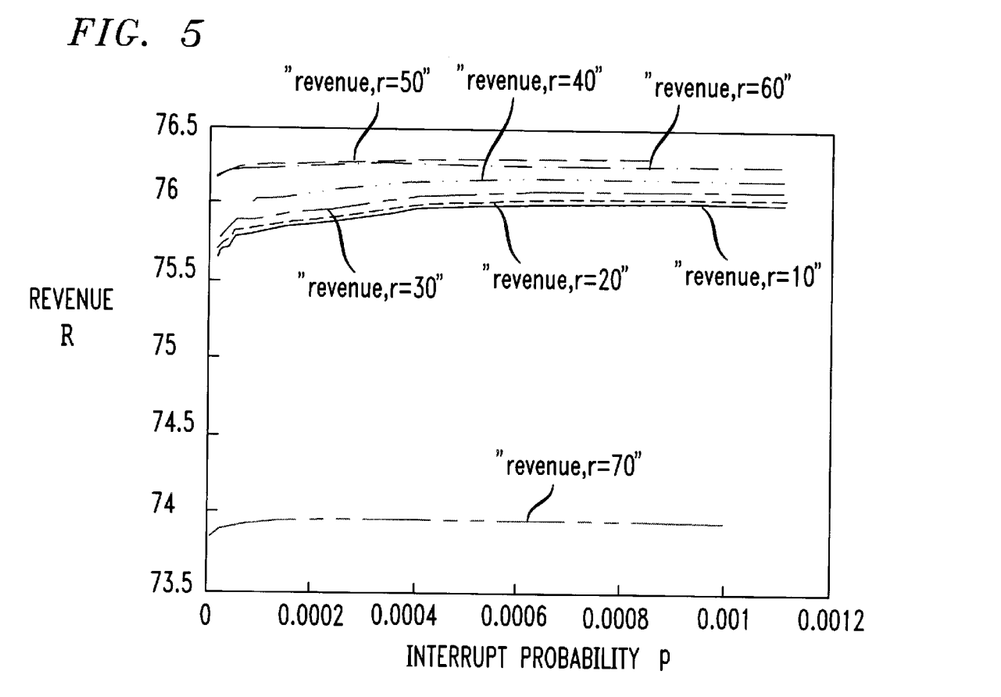
FIG. 5 depicts plots of the interrupt probability versus revenue for a third simulation example using various values of a reservation parameter according to the present invention.

As expected, for larger values of the reservation parameter r, both the blocking and interrupt performance of instantaneous-request calls are better. Plots of p versus the average revenue R are shown in FIG. 5 for several values of r, assuming that equation (1.2) is used with $r_B=r_I=1$ and $R_B=R_I=0$. The best results, R=76.3, are achieved first by r=50 and then r=60. In contrast, the best possible revenue with r=0 is 76.0 and with link partitioning is 74.3 (with capacity 30 dedicated to book-ahead calls). Since $r_B=r_I=1$, the revenue in this example corresponds to the carried load. Since the offered load is 80, the lost revenue has been reduced from 5.7 with link partitioning to 3.7 with resource sharing using r=50, a decrease of 35%.

From Table 2, it can be seen that the optimal solution in this example has the relatively high book-ahead blocking probability $P_B$=0.037. If book-ahead calls are more valuable, so that $r_B>r_I$, then the optimal value of r decreases, so that $P_B$ decreases.

Figure 6:
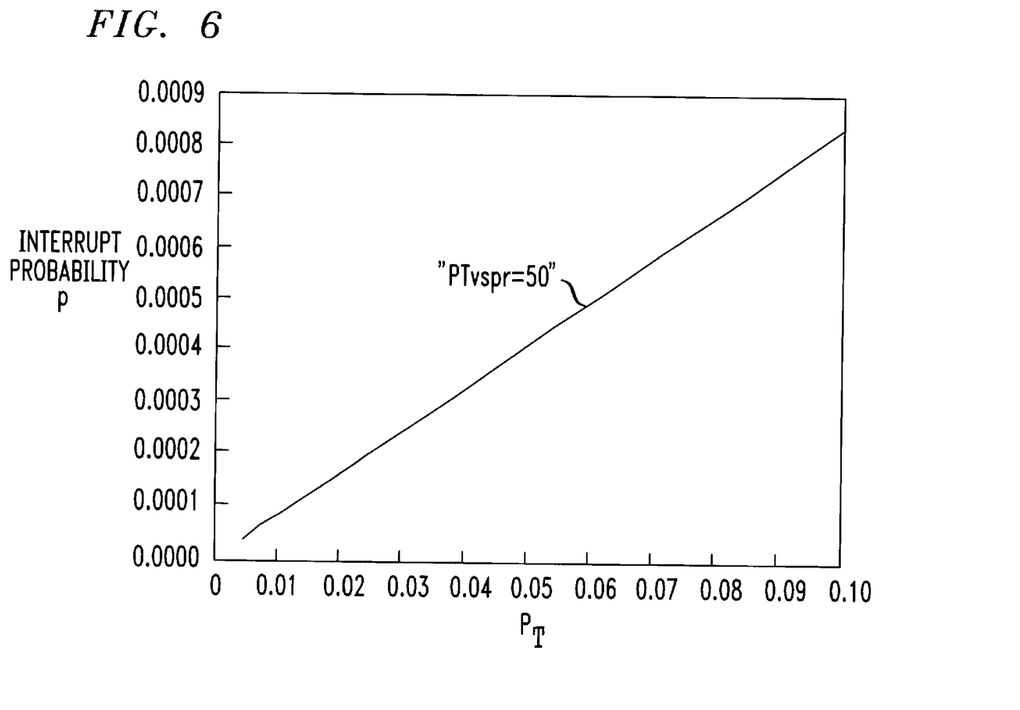
FIG. 6 depicts a plot of the interrupt probability threshold versus the realized interrupt probability for a third simulation example according to the present invention.
Figure 7:
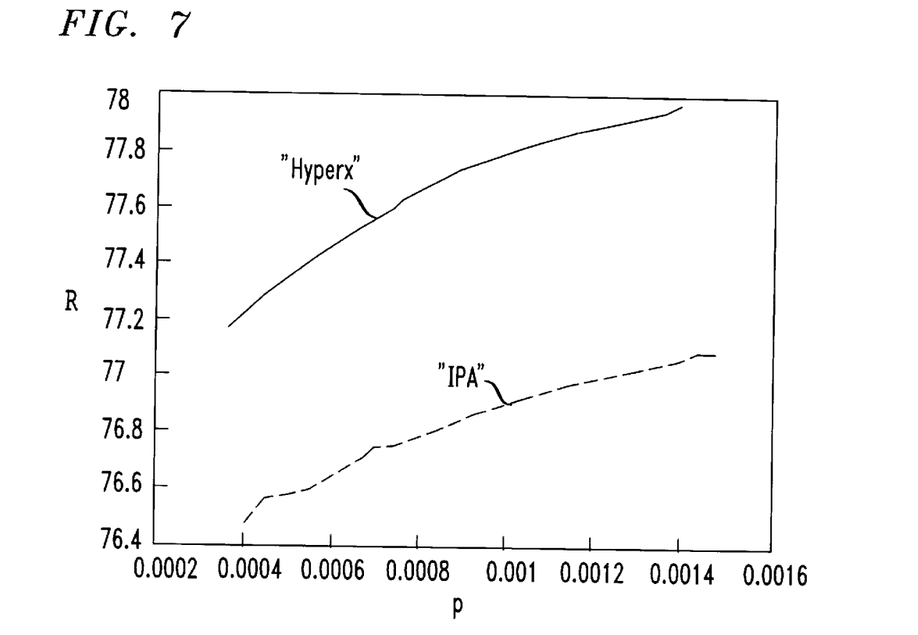
FIG. 7 depicts plots of interrupt probability versus revenue for two different classes of instantaneous-request calls with different exponential holding times according to the present invention.

From a design point of view, one more relationship has to be specified to run the network at a given operating point on the p versus R curve. This is the relationship between interrupt probability threshold $P_T$ and the realized interrupt probability p. For the optimal reservation parameter r=50, this (evidently linear) relationship is shown in FIG. 6.

3. Non-exponential Instantaneous-Request Holding-Time Distributions

On dropping the exponential holding-time assumption for instantaneous-request calls, the memoryless property of the instantaneous-request holding times is lost. (The memoryless property can be stated as follows P(X>t+s|X>s)=P(X>t) for all positive s and t. It implies that the elapsed holding times have no influence on the distribution of the remaining holding time.) The absence of the lack-of-memory property makes the computation of the interrupt probability complex. Given the holding-time cumulative distribution function (cdf) G and the elapsed holding time x for any call in progress, the remaining holding time of the call has complementary cdf $$H_x^c(x) = 1 - H_x(y) = \frac{G^c(x+y)}{G^c(x)}, y \geq 0, \quad (3.1)$$

where $G^c(x)=1-G(x)$. Hence, given the elapsed holding times $x_1, \ldots, x_n$ for n calls in progress, the remaining holding times are independent random variables with cdf's $H_{x1}, \ldots, H_{xn}$, defined as in (3.1). Since these cdf's are different, the exact computation of future events is a difficult combinatorial problem.

Fortunately, the following simplification appears to be quite effective. The elapsed holding times are ignored, which reduces the amount of information that needs to be stored. Ignoring the elapsed holding times, a Poisson arrival process is assumed and an infinite-server approximation is made. Then, conditioned on there being n calls in progress at some time in equilibrium, the remaining holding times of these n calls are distributed as independent random variables with cdf $G_e$, which is the stationary-excess cdf given by $$G_e(t) = \mu_I \int_o^t G^c(u) du$$

This property holds because the arrival-time and holding-time pairs are distributed according to a Poisson random measure on the plane. (See, for example, Theorem 1 of Eick, et al., cited above).

The infinite-server approximation ignoring elapsed holding times makes it possible to directly extend the FTA, OPA and IPA admission control algorithms to non-exponential holding-time distributions, without increasing the computational complexity. For example, instead of (2.4), the interrupt probability for IPA becomes $$p(T_o) = \sum_{i=1}^{l} \sum_{k=0}^{N(T_o)+(1+l)b-1} \binom{I(T_o)}{k} (G_e(T_i - T_o))^k (1 - G_e(T_i - T_o))^{I(T_o)-k} (1 - G(T_i - T_o)) \quad (3.2)$$

i.e., the old calls have cdf $G_e$, while the new call has cdf G. Expressions for the OPA and FTA algorithms can be obtained in a similar fashion.

EXAMPLE 4

To illustrate, the parameters of Example 3 are considered with r=50 and the holding-time distribution hyperexponential with balanced means, overall mean $1/\mu_I$ squared coefficient of variation $c_a^2$. (The squared coefficient of variation is the ratio of the variance to the square of its mean.) With the hyperexponential distribution, when a call arrives, with probability q, it chooses a holding time from an exponential distribution with mean $1/\mu_1$ and, with probability 1–q, it chooses a holding time from another exponential distribution with mean $1/\mu_2$. This model is natural to represent two subclasses of instantaneous-request calls with different exponential holding times. The balanced means assumption specifies one parameter by requiring that $q/\mu_1=(1-q)/\mu_2$. Each simulation run was for 500,000 time units, after deleting 25 time units to get rid of transients. Each curve is plotted based on 10 simulation runs. the simulation runs are longer than in Example 2 to get reasonable smooth curves. This is due to the increased variability of the holding-time distributions.

IPA based on the hyperexponential distribution (denoted by Hyperx) was compared with IPA based on the exponential distribution (denoted by ExpIPA); i.e., ExpIPA used the IPA algorithm in section 1.2 assuming the exponential distribution when the actual holding times are hyperexponential. The purpose of the comparison is study the performance of Hyperx as well as to check whether or not the ExpIPA is sensitive to holding-time distributions. For $c_a^2=10$, Hyperx and ExpIPA are compared in FIG. 7. The performance of Hyperx is clearly superior to that of ExpIPA. This example shows that knowledge of the holding-time distribution of instantaneous-request calls can be exploited to improve the revenue without sacrificing computational complexity.

EXAMPLE 5

Here, the case is considered in which the holding times of instantaneous-request calls are deterministic. This case is considered because the results can be compared to CHTA, which is clearly optimal in this special case for a fixed value of r. Therefore, the same parameters as in Example 4 are used here, with the only difference being that the holding times of instantaneous-request calls are deterministic. Note that the $G_e(t)=t\mu_I$ for $t\leq T$ is equal to 1 for t>T. Each simulation run was for 100,00 time units, after deleting 25 time units to get rid of transients. Each curve is plotted based on 10 simulation runs.

Figure 8:
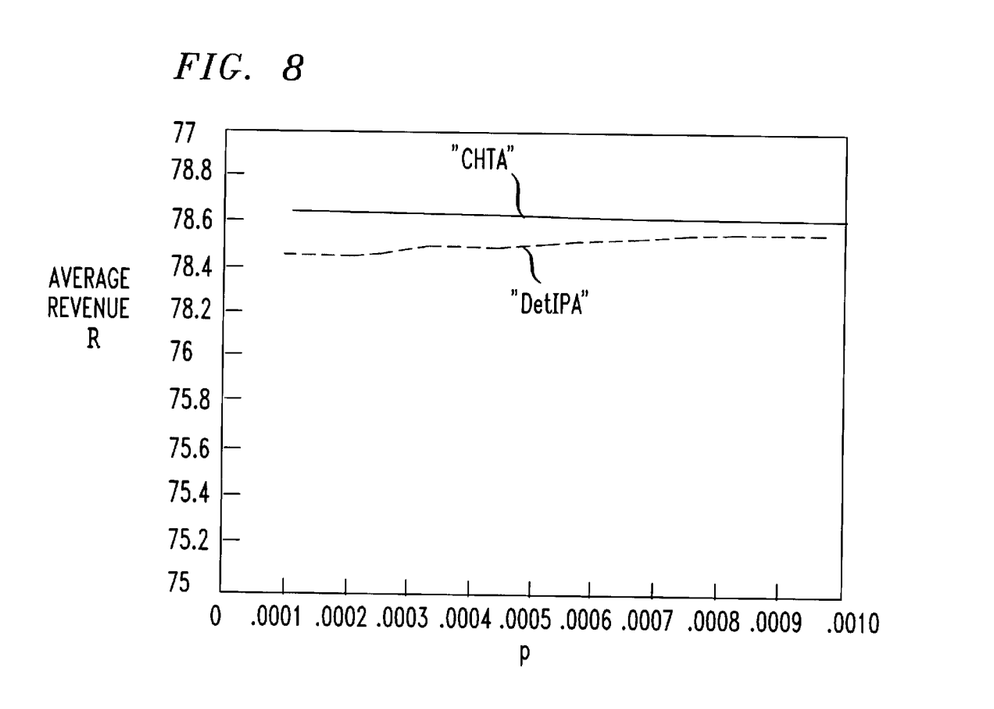
FIG. 8 depicts plots of interrupt probability versus revenue for instantaneous-request calls having deterministic holding times and constant holding times according to the present invention.

DetIPA and CHTA are compared in FIG. 8. In FIG. 8, the CHTA curve is the constant, allowing no interruptions. The gap between the CHTA and DetIPA is what is lost by not keeping track of and exploiting the ages. However, the curves in FIG. 8 indicate that this gap is small. Thus, the infinite-server approximation is indeed good and is nearly optimal in the only case for which the optimal solution is known.

Although several embodiments of the present invention are specifically described herein, it will be appreciated that modifications and variations of the present invention are covered by the above teachings and are within the purview of the appended claims without departing from the spirit and intended scope of the invention. For example, while the present description makes specific reference to resource sharing in a communication network, the resource sharing scheme according to the present invention can readily be implemented in many other contexts, such as, e.g., allocation of automated machinery resources in a manufacturing facility.

What is claimed is:

1. A call admission determination method in a network capable of receiving calls of a first type and a second type, the network having an associated interrupt probability and an associated interrupt probability threshold, comprising the steps of:

(a) upon arrival of a call of the first type, calculating an approximate value of the network's interrupt probability; and (b) if the approximate value of the interrupt probability is less than the network's interrupt probability threshold, admitting the call to service.

2. The method according to claim 1, wherein calls of the first type are instantaneous-request calls and calls of the second type are book-ahead calls.

3. The method according to claim 2, wherein the network further has an associated book-ahead call profile, and wherein the interrupt probability is a function of the number of instantaneous-request and book-ahead calls in service at the time the call arrives and of the book-ahead call profile.

4. The method according to claim 3, wherein the approximate value of the interrupt probability is calculated using an independent peaks approximation scheme.

5. The method according to claim 3, wherein the approximate value of the interrupt probability is calculated using a fixed time approximation scheme.

6. The method according to claim 3, wherein the approximate value of the interrupt probability is calculated using a one peak approximation scheme.

7. The method according to claim 3, wherein the network further has an associated book-ahead upper limit, further comprising the step of:

(c) upon reception of a book-ahead call, scheduling the book-ahead call for future service if the number of book-ahead calls in service at all future times is less than or equal to the network's book-ahead upper limit.

8. A method of allocating the resources of a resource-providing entity capable of servicing book-ahead users and instantaneous-request users, the entity having an associated service interruption probability and an associated resource interrupt probability threshold, comprising the steps of:

(a) upon the request of an instantaneous-request user for servicing by the resource-providing entity, calculating an approximate value of the entity's service interruption probability; and (b) if the approximate value of the service interruption probability is less than the resource-providing entity's resource interrupt probability threshold, servicing the user.

* * * * *